April 1, 1958
H. R. DRUM ET AL
2,828,556
ROAD SCRAPER
Filed Oct. 4, 1955
2 Sheets-Sheet 1
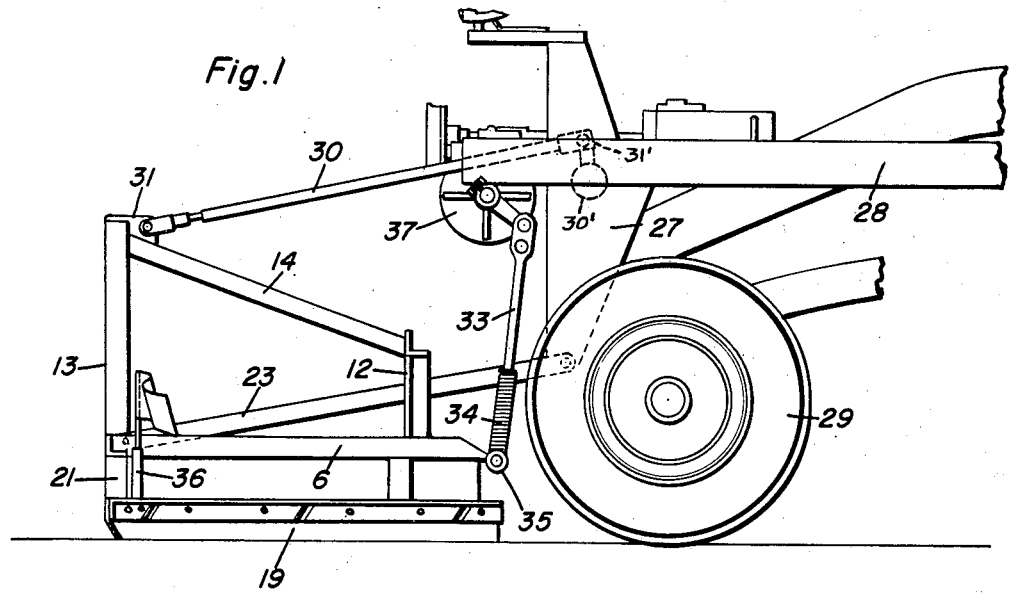
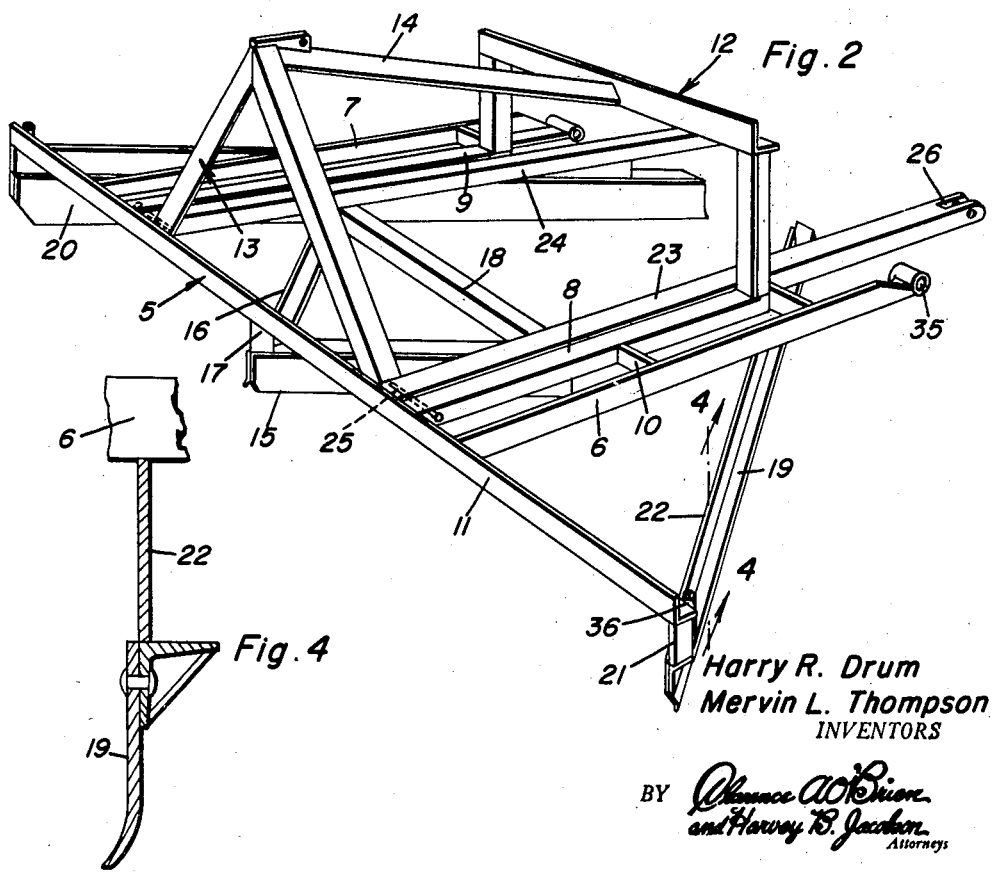
Harry R. Drum
Mervin L. Thompson
INVENTORS April 1, 1958   H. R. DRUM ET AL   2,828,556
ROAD SCRAPER
Filed Oct. 4, 1955   2 Sheets-Sheet 2
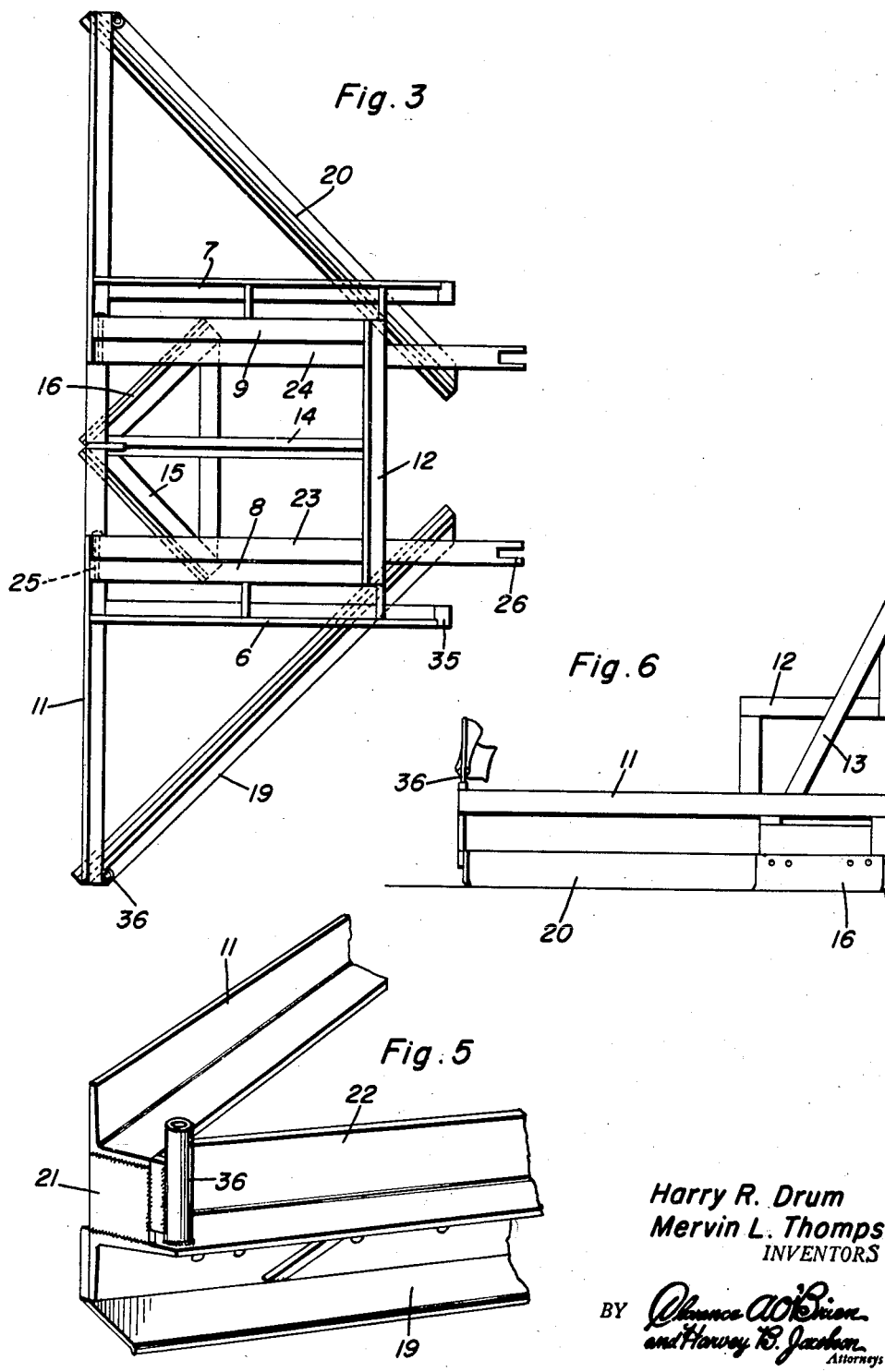
Harry R. Drum
Mervin L. Thompson
INVENTORS

United States Patent Office 2,828,556
Patented Apr. 1, 1958

2,828,556

ROAD SCRAPER

Harry R. Drum and Mervin L. Thompson, Ruthven, Iowa

Application October 4, 1955, Serial No. 538,384

1 Claim. (Cl. 37—15.4)

The present invention relates to new and useful improvements in road scrapers, and more particularly to a front scraper or drag supported in a position in advance of the front wheels as well as forwardly of the main scraper to remove ruts, holes, or other irregularities in the road and to provide a smooth surface over which the front wheels of the machine travel and to avoid bouncing of the machine and which results in an uneven and irregular scraping action by the main scraping blade.

An important object of the invention is to provide a front scraper supported in advance of the front wheels of the machine by the usual lifts provided on conventional road scrapers for a snow plow and by means of which the front scraper may be raised and lowered as conditions require.

Another object of the invention is to provide a frame for the scraper, to the upper portion of which the upper push bar of a hydraulic or mechanical lift is pivoted and providing a pair of lower push beams connecting the scraper to the machine and arranged to maintain the scraper blades horizontal with respect to the ground during vertical adjustment thereof by the hydraulic lift mechanism.

A still further object is to provide a device of this character of simple and practical construction, which is strong and durable, efficient and reliable in operation, relatively inexpensive to manufacture, and otherwise well adapted for the purpose for which the same is intended.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is a side elevational view;
Figure 2 is a perspective view;
Figure 3 is a top plan view;
Figure 4 is an enlarged fragmentary sectional view of one of the outer scraper blades taken on the line 4—4 of Figure 2;
Figure 5 is an enlarged fragmentary perspective view of the frame construction at one front corner of the scraper; and
Figure 6 is a fragmentary front elevational view.

Referring now to the drawings in detail wherein, for the purpose of illustration, we have disclosed a preferred embodiment of the invention, the numeral 5 designates the frame generally for the scraper and which comprises a pair of longitudinally extending arms 6 and 7 rigidly secured in spaced apart parallel relation to a pair of longitudinal frame members 8 and 9 by cross-bars 10. The front ends of the arms and frame members are welded or otherwise rigidly secured to a front cross-bar 11. An inverted U-shaped frame member 12 has its lower end portions welded or otherwise rigidly secured to the rear portion of the frame members 8 and 9 and an inverted V-shaped frame member 13 has its lower end portions welded or otherwise rigidly secured in an upright position to the front transverse frame member 11. A longitudinally extending brace bar 14 rigidly connects the upper portion of the inverted U-shaped frame member 12 and the inverted V-shaped frame member 13 rigidly to each other.

A pair of inner scraper blades 15 and 16 are secured in V-shaped arrangement at front converging end portions under the central portion of the front transverse frame member 11 by a vertical plate 17 which is welded at its lower edge to the front converging end portions of the blades 15 and 16, and is welded at its upper end to the underside of the transverse frame member 11. A cross-bar 18 is welded to the rear end portions of the blades 15 and 16 to rigidly brace the rearwardly diverging ends of the latter.

A pair of outer scraper blades 19 and 20 are secured at their front end portions to the ends of the front transverse frame member 11 by upstanding spacing plates 21 which are welded on top of the blades and to the underside of the frame member 11, and the blades 19 and 20 extend rearwardly in converging relation toward each other and outwardly with respect to the blades 15 and 16. The rear portions of blades 19 and 20 are welded in a diagonal position to the underside of arms 6 and 7 as well as to the frame members 8 and 9 by elongated edgewise upstanding plates 22 which extend upwardly above the blades 19 and 20 to increase the height thereof.

A pair of lower push beams 23 and 24 are pivoted at their front ends to the front transverse frame member 11 by pivot pins 25 and the rear ends of the beams 23 and 24 are constructed with bifurcations 26 for pivotally attaching to brackets 27 at the underside of the front end portions of the frame 28 of a conventional type of motor-operated road scraper or grader and with the scraper frame 5 and the blades carried thereby positioned forwardly of the front wheels 29 of the scraper machine.

The scraper machine includes a hydraulic lift mechanism 37 of conventional construction and provided with a forwardly projecting upper push bar 30 which is pivoted at its front end to a bracket 31 at the top of the V-shaped frame member 13 and at its rear end to a fixed part 30' of the scraper machine as at 31' and a pair of arms 33 extend downwardly from the lift mechanism and are pivotally connected by shock absorbing coil springs 34 to eyes 35 at the rear ends of the arms 6 and 7.

The front corners of the frame 5 are provided with flag sockets 36 for use as sighting guides for the operation of the machine.

The frame 5 and the inner and outer scraper blades carried thereby in advance of the front wheels 29 are pushed forwardly by the machine to scrape and smooth the surface of a road to remove ruts or depressions therein to reduce tendency of the front end of the machine to bounce as the road is scraped by the main scraper (not shown) of the machine.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In combination, a road scraper including front wheels and a front lift mechanism, a scraper frame including a front transverse frame member and a pair of rearwardly extending arms rigidly connected at their front ends to the transverse frame member, a front upright frame member rigidly connected at its lower end to the transverse frame member, a rear upright frame member rigidly connected at its lower end to the rear portion of said arms, a brace bar rigidly connecting the upper portions of the front and rear upright frame members to each other, an upper push bar connected to and extending forwardly from the lift mechanism and pivoted at its front end to the upper portion of the front upright frame member, a pair of lower push bars pivoted at their rear ends to the road scraper and pivoted at their front ends to the transverse frame member, a pair of lift arms extending downwardly from the lift mechanism and pivoted at their lower ends to the rear portion of said arms, and a pair of forwardly converging inner scraper blades and a pair of rearwardly converging outer scraper blades rigidly secured to the underside of said transverse frame member and also rigidly connected to the underside of said arms in advance of said front wheels.

References Cited in the file of this patent

UNITED STATES PATENTS

| | | |
|---|---|---|
| 1,684,439 | Flowers | Sept. 18, 1928 |
| 1,742,799 | Andrew | Jan. 7, 1930 |
| 1,807,639 | Stocker | June 2, 1931 |
| 1,994,817 | Gutafson | Mar. 19, 1935 |
| 2,259,747 | Gustafson | Oct. 21, 1941 |